US008588199B2

(12) United States Patent  (10) Patent No.: US 8,588,199 B2
Swanburg et al.  (45) Date of Patent: Nov. 19, 2013

(54) MOBILE DIGITAL VIDEO RECORDERS

(75) Inventors: Scott Allen Swanburg, Duluth, GA (US); Gary Lance Wolfson, Alpharetta, GA (US)

(73) Assignee: AT&T Mobility II, LLC, Atlanta, GA (US)

( * ) Notice: Subject to any disclaimer, the term of this patent is extended or adjusted under 35 U.S.C. 154(b) by 667 days.

(21) Appl. No.: 11/545,598

(22) Filed: Oct. 11, 2006

(65) Prior Publication Data

US 2008/0092177 A1   Apr. 17, 2008

(51) Int. Cl.
*H04B 7/216* (2006.01)

(52) U.S. Cl.
USPC ........................................................ 370/342

(58) Field of Classification Search
USPC ................ 370/342, 338, 328; 725/61, 81; 455/466, 412.1–412.2, 41.2, 418–420, 455/456.3, 552.1
See application file for complete search history.

(56) References Cited

U.S. PATENT DOCUMENTS

| | | | |
|---|---|---|---|
| 7,796,980 B1 * | 9/2010 | McKinney et al. | 455/418 |
| 2002/0080166 A1 | 6/2002 | Sweatt, III et al. | |
| 2002/0178448 A1 * | 11/2002 | Te Kiefte et al. | 725/46 |
| 2004/0141472 A1 * | 7/2004 | Haddad | 370/310 |
| 2005/0198510 A1 * | 9/2005 | Robert et al. | 713/175 |
| 2005/0210524 A1 * | 9/2005 | Dolph | 725/105 |
| 2006/0109854 A1 * | 5/2006 | Cancel | 370/401 |
| 2006/0149811 A1 * | 7/2006 | Bennett et al. | 709/203 |
| 2006/0173974 A1 | 8/2006 | Tang | |
| 2006/0184975 A1 * | 8/2006 | Casey | 725/81 |
| 2006/0206582 A1 | 9/2006 | Finn | |
| 2006/0257123 A1 * | 11/2006 | Horozov et al. | 386/112 |
| 2006/0258289 A1 * | 11/2006 | Dua | 455/41.3 |
| 2008/0075424 A1 * | 3/2008 | DeBie | 386/83 |

OTHER PUBLICATIONS

International Preliminary Report on Patentability, The International Bureau of WIPO, Report issued Apr. 15, 2009.

* cited by examiner

*Primary Examiner* — Brandon Miller
(74) *Attorney, Agent, or Firm* — Toler Law Group, PC

(57) ABSTRACT

With mobile devices and computers coming together and being internet-ready, there is tremendous potential for improved content-delivery mechanisms. What external Digital Video Recorders (DVR) and set-top boxes have done for traditional television industry, a similar set up is proposed to do the same for mobile devices. The fusion of a DVR and a mobile phone points to the future of mobile entertainment, with mobile users being able to watch, listen to, record, and share entertainment and informative multimedia content at any time and place.

21 Claims, 2 Drawing Sheets

MOBILE DIGITAL VIDEO RECORDERS

BACKGROUND OF THE INVENTION

1. Field of the Invention

The present invention relates generally to mobile devices. More specifically, the present invention relates to mobile digital video recorders.

2. Background of the Invention

Improved mobile technology is instrumental in blurring the line between mobile devices and computers. Mobile devices are getting more powerful, and computers are getting smaller. With wireless technology evolving at light speed, the fusion between the two is well under way. Equally important is how content delivery is blurring the line between computers and television/radio. With the digitization of almost all forms of media, television sets are getting more advanced, while computers are increasingly being seen as multimedia stations. The fusion between all of these technologies is apparent.

Mobile technology has significantly evolved over the last decade. Beyond voice conversations, mobile devices have increasingly been used to access more information. As overall mobile usage grows, consumers are getting more comfortable with the additional futures and web services that are being offered. Consumers are able to use their mobile phones to send text messages, use maps, take pictures, play games, send emails, download music, and even watch television programs. Naturally, this has led to an ongoing fusion of mobile networks and traditional landline broadband internet services. The traditional broadband internet has unleashed the tremendous potential for content delivery and internet users today can download music, videos, and even TV shows.

Mobile networks are not far behind this trend. Mobile operators have tuned into this demand for these needs, and have invested in upgrading their networks to be able to provide services such as email, enhanced short messaging, instant messaging, and especially internet access. The technology to provide multimedia over mobile networks, albeit scattered, still has potential to match other traditional content-delivery mechanisms. One of the enabling technologies to further the development of mobile networks is the IP Multimedia Subsystem (IMS). IMS basically describes a system by which mobile operators can offer and charge for discrete services that are usually available on the internet, alongside current services being offered. This architecture works with any packet-switching network, is IP-based, and therefore has tremendous potential for services like VoIP, multimedia downloads, IM, file sharing, streaming video, and other forms of content delivery. The advent of IMS has spurred such content delivery services that rival cable and satellite television.

Mobile TV is a promising frontier in the mobile handheld industry. Subscribers hit 1.2 million in 2005, and revenues grew from $32.8 million in 2004 to $47.5 million in 2005, forecasted to reach $1.9 billion in 2008. User surveys indicate that the bulk of the average American's 20-plus TV viewing hours each week goes to watching shorter programs, such as news footage or music videos. Such clips are ideal for viewing on a mobile phone, for instance while commuting on public transit. Industry pundits believe that the mobile handset will evolve into the third TV screen in our lives, behind the home TV and the PC. Mobile operators are unveiling video phones like the Sanyo MM-7400, for subsidized prices, because they believe it will encourage use of their video delivery services. A major telecommunications operator has recently announced plans to build a nationwide wireless video-and-audio network, offering TV-quality video speeds of 30 frames per second and up to 100 channels of content.

Since the current infrastructure for television and cable-based video delivery has existed for generations, it is paradoxically stagnant while being well-developed at the same time. On one hand, the monopoly that cable providers have had is indicative of the limitations to traditional cable technology. Even satellite TV has the problem of limited bandwidth, and having to use proprietary decompression technologies based on the service provider and the licensing terms. On the other hand, there have been several advancements at the user end of this method of delivery, such as set-top boxes and digital video recorders like TIVO or ReplayTV. Viewers can program this device to record television shows that they can play back later at a more convenient time, and skip commercials. However, the limitation still exists that viewers must have access to these devices, which implies that they must be in one physical location to view these recorded programs.

What is needed is the ability to playback multimedia content that is not restricted to being viewed on devices such as televisions, external DVRs, DVD players, computers, etc. Technologically, transfer of multimedia between devices has always been possible, but only with a solid know-how of the very technical process, involving cracking proprietary formats to enable playback of media files across multiple platforms. Currently, development efforts exist to enable users to transfer video content from existing DVRs to personal computers, but this system is still restricted to content that is delivered via traditional methods such as cable or satellite TV.

With the fast-growing infrastructure of delivering multimedia content to mobile users, a need exists for an ideal system that would allow these users to record this content on their mobile devices to be played back at any convenient time.

SUMMARY OF THE INVENTION

The present invention enables the use of mobile phones as digital video recorders. In particular, the present invention allows using mobile devices to record streaming media over mobile networks. Devices include combinations of microprocessor, software, and storage units within a mobile device, and the ability to transfer media and user instructions between multiple devices. As more mobile users are downloading multimedia content over wireless networks, the increasing availability of video and audio programming brings to the mobile device the potential of entertainment and information delivery that was once restricted to the television. The present invention brings mobile devices closer to fulfilling the functions of modern-day TV setups by incorporating a DVR unit within the functions of a cellular phone. The mobile user may subscribe to certain multimedia content streams. However, they may not be able to view live streams all the time. The DVR unit allows a mobile user to record a live multimedia stream as it is being broadcast, and play it back later at any time. The unit also enables mobile users to pause and rewind live TV on their mobile devices, just as they would on their conventional external DVRs. The definition of DVR includes what are commonly known as Personal Video Recorders, or PVRs.

In one exemplary embodiment, the present invention is a mobile device that includes a portable microprocessor, an antenna with a transmitter, a digital video recorder, a display device to watch and manage programs on the mobile device, and an audio output. The mobile device is ideally also enabled to communicate with other devices via wireless or wired means. The microprocessor is able to control all the components such as screen, transmitter, communication modules, etc. The microprocessor can be programmed via software to function as a DVR unit that is controlled via an interface provided to the user. Incoming multimedia streams are received by the mobile device and decoded by the DVR unit. At this point, depending on the user's instructions, this multimedia stream could either be viewed immediately, or stored on a storage medium by the DVR system to be viewed at any time in the future. The user may also pause and rewind live streams.

In another exemplary embodiment, the present invention is a mobile device that incorporates a DVR. This DVR has open lines of communication with other devices such as digital TVs, external DVRs, and computers over a network. The DVR unit updates its program schedule by connecting to a main server, either provided by the mobile operator over the internet, or via a television operator. The DVR unit downloads this schedule and presents it to the user, who will be able to search through all the television programs and schedule the device for recording. According to an exemplary embodiment of the present invention, the DVR unit may also be used to navigate and schedule recording options with another external DVR device or computer. In this way, the user is equipped with both space-shifting abilities (across multiple devices) and time-shifting abilities, thereby increasing the value of the content provided to the user by the operator.

DETAILED DESCRIPTION OF THE INVENTION

The present invention allows a mobile user to directly record incoming video and audio streams onto her mobile device. In an exemplary embodiment, this can be thought of as fusing a Digital Video Recorder (DVR) with a cellular phone. The multimedia stream is broadcast from a satellite or 3G network, is received and decoded by the mobile device, and is stored on a hard drive on board the mobile device using current and future compression technologies. The user then has the choice of transferring the saved program to a computer, or to an external DVR such as the conventional TiVo and its equivalents, and can even view the program on the mobile device at any time. The user can also pause and rewind live TV and radio with the use of a buffer to store the incoming signal. Finally, for content delivery services being offered by mobile operators, a multitude of proprietary encoding algorithms and Digital Rights Management (DRM) can be used to ensure that users do not breach copyright or similar licenses associated with the use of the media.

In an exemplary embodiment, the invention is a device that combines a mobile device such as a smartphone or PDA with a programmable unit that performs the task of a DVR. The device would be capable of receiving multimedia such as TV shows and other programmed entertainment/information. The device would be equipped with a screen suitable to displaying video, audio out capabilities, and a processor for decoding the media and playing it via the screen or a headphone jack or built-in speaker. The device would also have a hard drive for storing the multimedia data, and preferably a removable media slot similar to today's SD or flash memory storage mechanisms. There would be software on the device that presents the user with various recording options, such as programmed recording, automated TV guide downloads, linking the device with other devices via BLUETOOTH, Wi-Fi, USB, and other equivalents, and the ability to analyze the user's preferences and make recommendations and suggestions based on these preferences.

Figure 1:
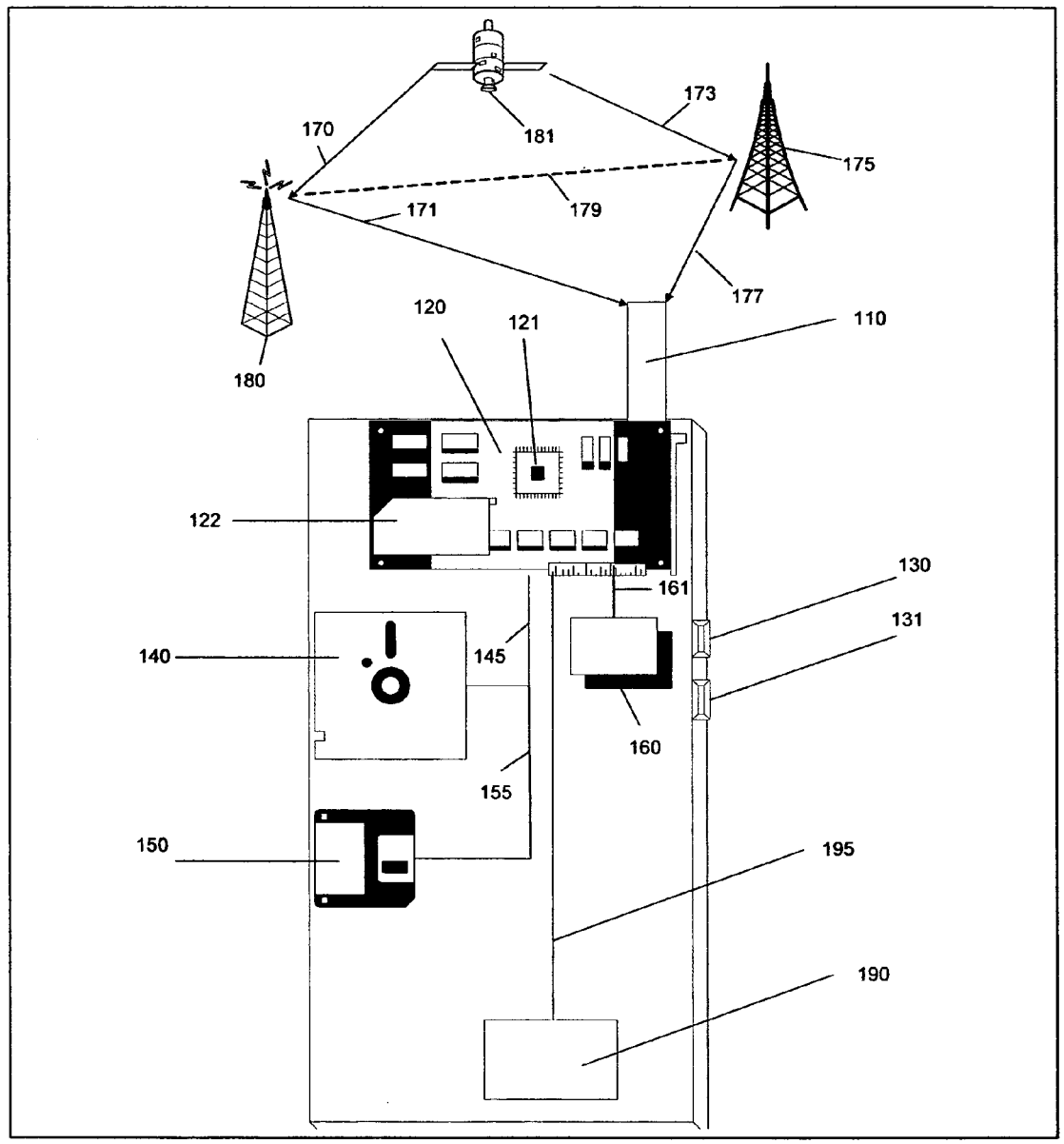
FIG. 1 shows a mobile DVR device according to an exemplary embodiment of the present invention.

FIG. 1 shows an exemplary embodiment of a device according to the present invention. A television or radio satellite 181 communicates through path 170 with a telecommunication tower 180. The tower could be a standard mobile tower, or a gateway between the mobile device and an IP-capable 3G or equivalent mobile network. Alternatively, the tower could be an IMS gateway, and the communication path 171 could be a Session Initiation Protocol (SIP) signal, with the mobile device having its own unique SIP address and communicating with a 3G or equivalent network. Alternately a TV/Radio base station 175 communicates through communication path 177 with the mobile device. The base station 175 can also communicate through path 179 with the mobile tower 180 which acts as a gateway between the TV network and the mobile device.

The mobile device antenna 110 facilitates data transfer to the transmitter 120 that is operated by a microprocessor 121. Component 122 that is shown in FIG. 1 is an IMS Subscriber Identity Module, or ISIM card, that securely stores the key identifying a mobile phone service subscriber. The ISIM card allows the user access to the cellular network, and could be used to enforce licensing limitations on media usage. The microprocessor 121 is programmed with software that allows it to communicate with a screen 160 through path 161, an onboard storage device 140 through path 145, a removable disk drive 150 through path 155, and an audio output device 190 through path 195. The microprocessor is also programmed to decode incoming data transmissions, and send this data to either storage device.

Additionally, the combination of this microprocessor and installed software can be thought of as a DVR unit within the mobile device. This DVR unit should be able to decode and encode virtually any current or future proprietary or open formats, including but not limited to MPEG, DiVX, MP3, OGG, ACC, RealMedia, or equivalent formats for video and audio. The DVR unit encodes this data into the same or different formats, and stores the files on either storage device. When a user wishes to view stored video or listen to stored audio, the DVR retrieves the requested file, and plays it through a combination of the screen and the speaker/headphones. Since the mobile device is ideally capable of communication with other devices via BLUETOOTH, USB, WiFi, WiMax, and equivalents, the DVR unit can also be used to transfer data from either storage device to another device for storage or playback.

In one of the many unique features of the present invention, the DVR unit may be programmed in a way that allows the user of the device to select the specific audio/video data that is to be recorded. The user navigates these options via a graphical interface. Based on a database of programs available to the user—dependent upon his or her location and/or the content delivery system being used and updated at regular intervals—the DVR unit selects and records the desired programs. The user can instruct the device to record a TV show through an entire season from a particular channel. Alternatively, the user could create a list based on certain attributes of the media they want. For example, one could have a search for "FORD, HARRISON & Movies/Action Adventure" to find any Action Adventure movies starring Harrison Ford. In addition to recording programs specified by the users, the device could be capable recording of additional programs based on the viewing/listening habits of the user. The user could also rate programs favorably or unfavorably; these ratings could be used to produce a recommendation score for unrated shows. Content delivery mechanisms could be any combination of analog broadcasts, digital broadcasts, subscription-based IPTV, etc.

Another feature that could be incorporated is a "live buffer," which is a temporary recording of (up to) 30 minutes of recently-viewed programming. This buffer allows users to pause or rewind "live TV" within a 30-minute window, which is an advantage when an unwanted interruption (such as a ringing phone or crying baby) occurs at an inopportune time in the program. If the user chooses to record the current program, any available portion of that program in the live buffer will be included in the recording. The device could also play previously-recorded programs while recording a new program. In addition, button 130, or an equivalent softkey may act as a shortcut key that activates preset commands to record video or television programs without having to navigate through the user interface. Similarly, button 131, or an equivalent softkey may be used to activate immediate recording of audio data.

Another unique feature of the present invention is connectivity with other devices. The DVR unit also has the ability to use the transmitter 120 to connect with other devices such as personal computers, external DVRs, and television sets. The connection could be wired, such as USB, FireWire or equivalents, or it could be wireless, incorporating existing and future equivalents of technologies such as Wi-Fi, WiMax, BLUETOOTH, etc. The purpose of this connectivity is multifold; it allows users to schedule recordings on a website offered by the content provider over a Wi-Fi, GPRS, or similar mobile internet service, transfer recordings between PVR units (Multi-Room Viewing (MRV)) or to/from a home computer, play music and view photos over the network, and access third-party applications such as plug-ins and add-ons written for the DVR unit on the device.

Figure 2:
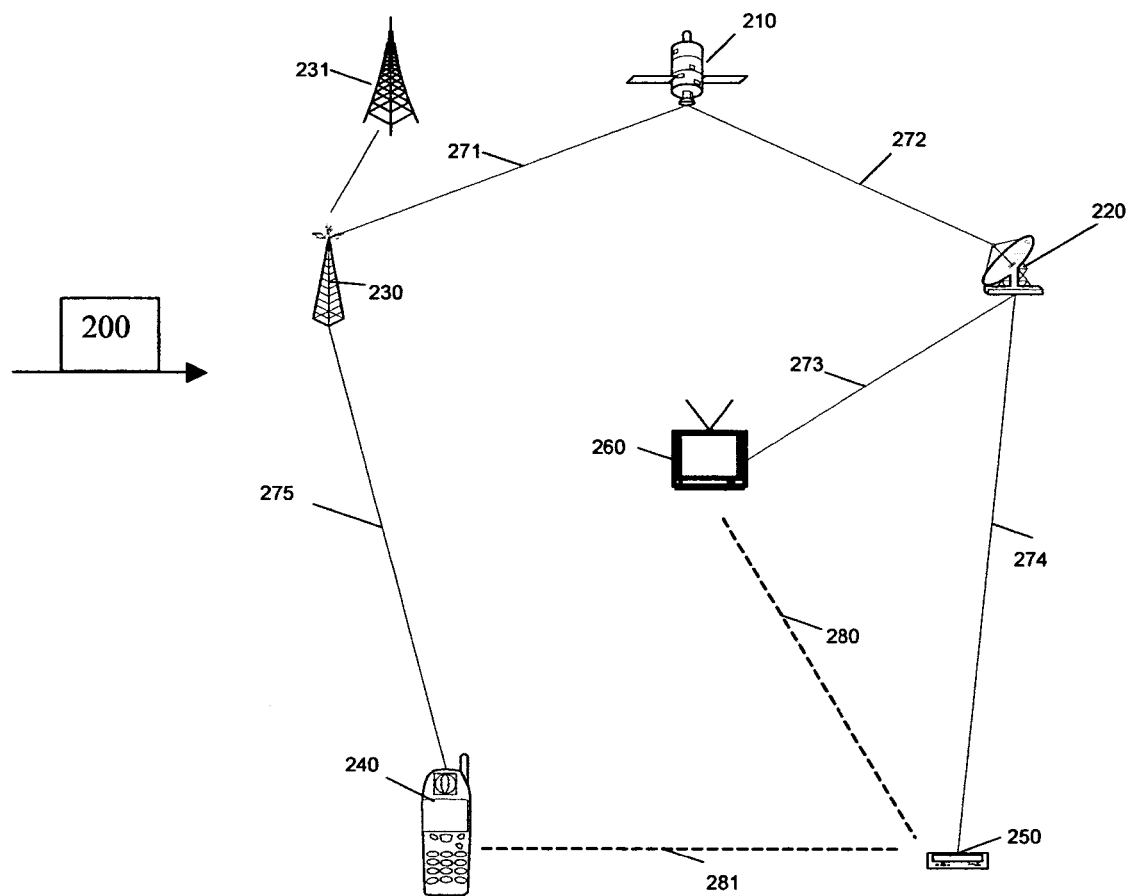
FIG. 2 shows an application of a mobile DVR device according to an exemplary embodiment of the present invention.

FIG. 2 shows this use of this communication feature according to an embodiment of the invention. A television or radio satellite 210 communicates with communication tower 230 through the telecommunication path 271. Alternatively, a TV or Radio base station 231 would communicate with communication tower 230 the same type of data/information. The communication tower 230 communicates with the mobile device 240 through path 275. Path 275 can transmit analog and digital data, such as a TV broadcast (if the mobile device is equipped with a capable TV tuner), GPRS/CDMA or an equivalent IP-capable network, and equivalents thereof. The communication tower 230 can include a gateway to an IP enabled 3G or equivalent network. Alternatively, the telecommunication tower could simply be a TV or radio broadcaster, and the mobile device 240 could be equipped with a tuner.

Similarly, the satellite 210 also communicates with a cable, satellite, or IPTV service provider 220 through the telecommunication path 272. The service provider 220 communicates with television through path 273, and to an external DVR 250 through path 274. These paths could be equivalent to any conventional transmission technologies, including but not limited to IPTV, HDTV, digital or analog broadcasts, and via cable, satellite, or the internet. The external DVR 250 captures all TV programs and data for future viewing, similar to existing external DVRs such as TiVo, etc. All saved programs can be watched through the connection path 280 from DVR 250 to the TV 260.

However, there exists a link 281 between the mobile device 240 and the external DVR 250. The purpose of this link is multifold: since both devices are programmable and can send and receive data, there are many tasks that can be accomplished. The mobile user may have used the mobile device to record a multimedia stream over the wireless network, and may want to watch the recorded program on her television. In that case, the mobile device would transfer the saved file to the external DVR, which the user could then access via television. Alternatively, the user may have recorded broadcasts from the content-provider 220 onto the external DVR, and wishes to carry these files with them on the mobile device. The user should then be able to access the external DVR via the mobile device, and transfer the files across to the mobile device. This bidirectional application allows for many versatile uses of the present invention.

There exist several methods to curb any potential abuse of the flexibility provided by the current invention. Current and future equivalents to Digital Rights Management (DRM) and copy protection are useful in ensuring that the user does not violate any copyright or licensing violations. For instance, content can be encoded in a way that instructs the DVR unit to automatically delete pay-per-view content after a preset period of time. This could be useful for both space-shifting and time-shifting which will allow users to transfer programming from the DVR to a computer or other device. Also, in relation to live sports broadcast that are typically licensed to specific broadcaster, media access could be restricted to users outside of designated broadcast areas. The NFL and TiVo have already agreed to protect live NFL games against real-time retransmission outside of the subscriber's local television market while providing consumers with the ability to remotely access their own recorded broadcast programming after its initial airing.

The crux of the invention, however, remains the inclusion of a DVR within the functionality of a mobile device. The user is able to preview programs, view listings, and select any number of broadcasts to be downloaded. Since phones are able to handle larger amounts of media, storage capacities are on the rise by default, as are processing speeds. By enabling cellular users to carry their preferred entertainment and information with them at all times, the present invention is a vital part of the trend to increase productivity via technological application in everyday life.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. An apparatus comprising:
   a mobile telecommunication device having a unique session initiation protocol address, wherein the mobile telecommunication device is able to communicate via a third generation or an equivalent network and is capable of receiving and recording a multimedia data stream;
   a live buffer within the mobile telecommunication device, the live buffer holding a temporary recording of the multimedia data stream, the live buffer allowing a user of the mobile telecommunication device to control playback of the multimedia data stream;
   an output device within the mobile telecommunication device;
   a storage unit within the mobile telecommunication device;
   a subscriber identity module within the mobile telecommunication device, the subscriber identity module securely storing a unique identifier of the user of the mobile telecommunication device; and
   a direct bi-directional link to an external digital video recorder;
   wherein the direct bi-directional link allows the mobile telecommunication device and the external digital video recorder to exchange content via a direct connection, the direct bi-directional link allowing the mobile telecommunication device to send saved media files from the mobile telecommunication device to the external digital video recorder and receive multimedia data streams at the mobile telecommunication device from the external digital video recorder;
   wherein the mobile telecommunication device receives and records the multimedia data stream by using any combination of a microprocessor unit and a software program to function as a digital video recorder unit;
   wherein the unique identifier is used to unlock a copy-protected multimedia data stream;
   wherein the digital video recorder unit selects and records a particular program based on a database of programs available to the user, the database of programs being dependent upon a user's location and a content delivery system offered by a mobile operator, the content delivery system being used and updated at regular intervals; and
   wherein the digital video recorder unit monitors selections from the user and makes recommendations based on the selections of the user, each recommendation including a recommendation score based on a rating of the selections from the user.

2. The apparatus of claim 1, wherein the mobile telecommunication device comprises a mobile phone, a smartphone, a personal digital assistant, a mobile personal computer, or a combination thereof.

3. The apparatus of claim 1, wherein the multimedia data stream may be recorded at any time at a request of the user.

4. The apparatus of claim 3, wherein the user can select a multimedia data stream to be recorded at a specified time.

5. The apparatus of claim 1, wherein the multimedia data stream comprises audio data, video data, or a combination thereof.

6. The apparatus of claim 5, wherein the multimedia data stream comprises data encoded using a moving picture experts group format, an audio video interleaved format, a RealMedia format, a QuickTime format, a proprietary format, an open format, or any combination thereof.

7. The apparatus of claim 1, wherein the output device comprises a display device, an audio speaker, a headphone, or a combination thereof.

8. The apparatus of claim 1, wherein the storage unit comprises an internal flash drive, a hard disk drive, a removable flash drive, or a combination thereof.

9. An apparatus comprising:
   a mobile telecommunication device having a storage unit, a display, an audio output, a unique session initiation protocol address, and a module for communicating via a third generation or an equivalent network, the module securely storing a unique identifier of a user of the mobile device;
   a digital video recorder unit within the mobile telecommunication device capable of receiving a multimedia data stream from a wireless network and recording the multimedia data stream to the storage unit;
   a live buffer within the mobile telecommunication device, the live buffer holding a temporary recording of the multimedia data stream, the live buffer allowing the user to control playback of the multimedia data stream; and
   a direct bi-directional link to an external digital video recorder;
   wherein the direct bi-directional link allows the mobile telecommunication device and the external digital video recorder to exchange content via a direct connection, the direct bi-directional link allowing the mobile telecommunication device to send saved media files from the mobile telecommunication device to the external digital video recorder and receive multimedia data streams at the mobile telecommunication device from the external digital video recorder;
   wherein the unique identifier is used to unlock a copy-protected multimedia data stream;
   wherein the digital video recorder unit selects and records a particular program based on a database of programs available to the user, the database of programs dependent upon a user's location and a content delivery system offered by a mobile operator, the content delivery system being used and updated at regular intervals; and
   wherein the digital video recorder unit monitors selections of the user and makes recommendations based on the selections of the user, each recommendation including a recommendation score based on a rating of the selections from the user.

10. The apparatus of claim 9, wherein the mobile telecommunication device comprises a mobile phone, a smartphone, a PDA, a mobile personal computer, or a combination thereof.

11. The apparatus of claim 9, wherein the digital video recorder unit comprises any combination of a microprocessor unit and a software program.

12. The apparatus of claim 9, wherein the multimedia data stream may be recorded at any time at a request of the user.

13. The apparatus of claim 12, wherein the user can select a multimedia data stream to be recorded at a specified time.

14. The apparatus of claim 9, wherein the multimedia data stream comprises audio data, video data, or a combination thereof.

15. The apparatus of claim 14, wherein the multimedia data stream comprises data encoded in a moving picture experts group format, an audio video interleaved format, a RealMedia format, a QuickTime format, a proprietary format, an open format, or a combination thereof.

16. The apparatus of claim 9, wherein the storage unit comprises an internal flash drive, a hard disk drive, a removable flash drive, or a combination thereof.

17. A method comprising:
   determining that a unique key securely stored on a subscriber identity module on a mobile device is a valid license to unlock a multimedia stream when decoding the multimedia stream and recording a temporary recording of the multimedia stream to a live buffer and controlling playback of the multimedia stream, wherein the multimedia stream is requested and received by the mobile device via a mobile network based on a request from a user;
   based on instructions of the user, recording the multimedia data stream to a storage unit within the mobile device, thereafter exchanging the multimedia data stream with an external digital video recorder via a direct bi-directional link, the direct bi-directional link allowing the mobile device to send the multimedia data stream from the mobile device to the external digital video recorder and receive an external multimedia data stream at the mobile device from the external digital video recorder, the exchange of the multimedia data stream followed by playing the multimedia data stream through the external digital video recorder and monitoring request and recommending content based on the request;
   wherein the recording of the multimedia data stream is based on a database of programs available to the mobile user, the database of programs being dependent upon a location of the user and a content delivery system offered by a mobile operator being used and updated at regular intervals;
   wherein the recording of the multimedia data stream is based on ratings of the user,
   wherein content is recommended to the mobile user, each recommendation including a recommendation score based on the ratings of the user; and
   wherein the mobile device has a unique session initiation protocol address and a module for communicating via a third generation or an equivalent network.

18. The method of claim 17, further comprising: presenting the user with a list of multimedia content available for streaming.

19. The method of claim 17, further comprising: presenting the user with a list of recommended multimedia content available for streaming.

20. The method of claim 18, further comprising: presenting the user with a list of recommended content based on requests from other users.

21. A device comprising:
   a microprocessor;
   a transmitter operated by the microprocessor, the transmitter to communicate with a cellular network to stream media;
   a subscriber identity module card in communication with the microprocessor, the subscriber identity module card securely storing a key identifying a subscriber, the subscriber identity module card allowing the subscriber to access the cellular network, the key on the subscriber identity module card used to enforce licensing limitations on usage of the media by unlocking a copy-protected multimedia data stream;
   a storage device in communication with the microprocessor, the storage device to store the media;
   a live buffer in communication with the microprocessor, the live buffer holding a temporary recording of the multimedia data stream, the live buffer allowing the subscriber to control playback of the multimedia data stream;
   a direct bi-directional link to an external digital video recorder, the direct bi-directional link allowing the microprocessor and the external digital video recorder to exchange content via a direct connection, the direct bi-directional link allowing the microprocessor to send saved media files from the storage device to the external digital video recorder and receive external media files at the microprocessor from the external digital video recorder; and
   an output in communication with the microprocessor, the output to play the media;
   wherein the device receives and records the multimedia data stream by using any combination of a microprocessor unit and a software program to function as a digital video recorder unit;
   wherein the digital video recorder unit selects and records a particular program based on a database of programs available to the subscriber, the database of programs being dependent upon a subscriber's location and a content delivery system offered by a mobile operator, the content delivery system being used and updated at regular intervals; and
   wherein the digital video recorder unit monitors selections from the subscriber and makes recommendations to the subscriber based on the selections from the subscriber, each recommendation including a recommendation score based on a rating of the selections from the subscriber.

* * * * *